United States Patent
Kitahara et al.

(10) Patent No.: US 11,254,165 B2
(45) Date of Patent: Feb. 22, 2022

(54) PRECURED TIRE TREAD WITH FABRIC REINFORCING LAYER

(71) Applicants: Bridgestone Americas Tire Operations, LLC, Nashville, TN (US); Bridgestone Bandag, LLC, Muscatine, IA (US); Bridgestone Corporation, Tokyo (JP)

(72) Inventors: Kota Kitahara, Copley, OH (US); Todd A. Buxton, Norton, OH (US); Terry A. Westaway, Conesville, IA (US)

(73) Assignees: Bridgestone Bandag, LLC, Muscatine, IA (US); Bridgestone Americas Tire Operations, LLC, Nashville, TN (US); Bridgestone Corporation, Tokyo (JP)

( * ) Notice: Subject to any disclaimer, the term of this patent is extended or adjusted under 35 U.S.C. 154(b) by 593 days.

(21) Appl. No.: 15/107,114

(22) PCT Filed: Dec. 16, 2014

(86) PCT No.: PCT/US2014/070477
§ 371 (c)(1),
(2) Date: Jun. 22, 2016

(87) PCT Pub. No.: WO2015/100060
PCT Pub. Date: Jul. 2, 2015

(65) Prior Publication Data
US 2017/0021671 A1    Jan. 26, 2017

Related U.S. Application Data

(60) Provisional application No. 61/920,287, filed on Dec. 23, 2013.

(51) Int. Cl.
B29D 30/56    (2006.01)
B60C 9/00     (2006.01)
(Continued)

(52) U.S. Cl.
CPC ............ *B60C 9/0042* (2013.01); *B29D 30/56* (2013.01); *B60C 9/0057* (2013.01); *B60C 11/02* (2013.01);
(Continued)

(58) Field of Classification Search
CPC ..... B60C 11/02; B60C 9/0042; B60C 9/0057; B29D 30/56
See application file for complete search history.

(56) References Cited

U.S. PATENT DOCUMENTS 3,841,376 A * 10/1974 Paulin .................... B29D 30/54
                                                        152/532
3,951,719 A *  4/1976 Hough .................. B29D 30/08
                                                         156/96

(Continued)

FOREIGN PATENT DOCUMENTS

CN    101462468 A    6/2009
CN    102442157 A    5/2012
(Continued)

OTHER PUBLICATIONS

Kawamata JP 2009-166650 machine translation as provided by https://dossier1.j-platpat.inpit.go.jp/tri/all/odse/ODSE_GM101_Top. action on Aug. 16, 2018 (Year: 2009).*

(Continued)

*Primary Examiner* — Timothy Kennedy
*Assistant Examiner* — Alexander A Wang

(57) ABSTRACT

A precured tread assembly for mounting on a tire casing is provided. The precured tread assembly includes a tread portion having a mounting surface and an opposing ground-engaging surface with a plurality of grooves therein. A reinforcing fabric layer is attached to the mounting surface of the tread portion.

16 Claims, 2 Drawing Sheets

(51) Int. Cl.
*B60C 11/02* (2006.01)
*B60C 11/03* (2006.01)

(52) U.S. Cl.
CPC ....... *B60C 11/03* (2013.01); *B60C 2011/0339* (2013.01)

(56) References Cited

U.S. PATENT DOCUMENTS

| | | | | | |
|---|---|---|---|---|---|
| 4,185,056 | A | * | 1/1980 | Detwiler | B29D 30/542 264/220 |
| 4,767,480 | A | * | 8/1988 | Goldstein | B29D 30/52 156/909 |
| 4,962,803 | A | * | 10/1990 | Welter | B60C 9/09 152/510 |
| 6,056,852 | A | * | 5/2000 | Presti | B29D 30/542 156/394.1 |
| 6,142,204 | A | * | 11/2000 | Omoteda | B60C 9/14 152/516 |
| 2003/0201047 | A1 | * | 10/2003 | Rayman | B60C 1/0016 152/209.1 |
| 2011/0008636 | A1 | * | 1/2011 | Kiuchi | C08J 5/24 428/516 |
| 2012/0067485 | A1 | * | 3/2012 | Imhoff | B29B 15/08 152/451 |
| 2012/0308793 | A1 | * | 12/2012 | Kimura | B60C 1/0016 428/212 |
| 2013/0146189 | A1 | * | 6/2013 | Majumdar | B29D 30/56 152/209.1 |
| 2016/0325517 | A1 | * | 11/2016 | Westaway | B29D 30/56 |

FOREIGN PATENT DOCUMENTS

| | | | |
|---|---|---|---|
| CN | 203697867 U | * | 7/2014 |
| EP | 2 072 285 | | 6/2009 |
| JP | 08-216616 | | 8/1996 |
| JP | 2009-166650 | | 7/2009 |
| JP | 2009166650 A | * | 7/2009 |
| JP | 2012-183895 | | 9/2012 |
| JP | 2012183895 A | * | 9/2012 |
| JP | 5211707 B2 | * | 6/2013 |

OTHER PUBLICATIONS

JP2009166650 machine translation (Year: 2009).*
The International Search Report and Written Opinion issued in PCT/US2014/070477, dated Mar. 31, 2015.
English Machine Translation of CN101462468A.
English Machine Translation of CN102442157A.

* cited by examiner

PRECURED TIRE TREAD WITH FABRIC REINFORCING LAYER

BACKGROUND OF THE INVENTION

Retreaded tires provide an economical way to gain additional use from tire casings after the original tread or retread has become worn. According to a conventional method of retreading, sometimes referred to as cold process retreading, worn tire tread on a used tire is removed to create a buffed, generally smooth treadless surface about the circumference of the tire casing to which a new layer of tread may be bonded.

The tire casing is then typically inspected for injuries, some of which may be skived and filled with a repair gum while others may be severe enough to warrant rejection of the casing. Next, a layer of cushion gum may be applied to the back, i.e., the inside surface of a new layer of tread, or alternatively, the layer of cushion gum may be applied directly to the tacky surface on the tire casing. Conventionally, the cushion gum is a layer of uncured rubber material. The cushion gum and tread may be applied in combination about the circumference of the tire casing to create a retreaded tire assembly for curing. As an alternative, a length of tire tread may be wrapped around the tire casing with the cushion gum already applied. The cushion gum may form the bond between the tread and the tire casing during curing.

New tread for precured retreading applications is typically molded as a single piece with the tread pattern on one side. Such treads are sometimes referred to a precured tread. The precured tread typically has a width corresponding to the width of the crown of the casing and is cut to the length corresponding to the casing circumference. Alternatively, continuous replacement treads in the shape of a ring (i.e., ring treads) have also been used to retread the buffed casing. After the new precured tread is applied, a roller pressing process, commonly referred to as stitching, is next performed on the assembly to force air from between the tread strip and casing.

Following assembly of the tire casing, cement, cushion gum and tread, the overall retreaded tire assembly may be placed within a flexible rubber envelope. An airtight seal may be created between the envelope and the bead of the tire. The entire envelope tire assembly may be placed within a curing chamber and subjected to a vulcanization process that binds the materials together.

One issue that can prevent a tire casing from being reused with a new tread is excessive damage to the tire casing. For example, cuts or punctures that penetrate through the tread can damage the underlying casing. While some of the cuts or punctures in the tire casing can be repaired, if there is too much damage it may be necessary to scrap the tire casing. Even if the casing can be repaired, such repairs can be a time consuming process.

BRIEF SUMMARY OF THE INVENTION

The invention provides a precured tread assembly for mounting on a tire casing. The precured tread assembly includes a tread portion having a mounting surface and an opposing ground-engaging surface with a plurality of grooves therein. A reinforcing fabric layer is attached to the mounting surface of the tread portion.

In another aspect, the invention provides a method of retreading a tire. The method includes the step of removing a used tread from an outer surface of a tire casing. A precured tread assembly is applied to the outer surface of the tire casing. The precured tread assembly includes a tread portion having a mounting surface and an opposing ground-engaging surface with a plurality of grooves therein. A reinforcing fabric layer is attached to the mounting surface of the tread portion. The precured tread assembly being applied to the tire casing such that the fabric reinforcing layer is interposed between the tire casing and tread portion.

According to a further aspect, the invention provides a tire including a tire casing and a precured tread assembly applied to the tire casing/the precured tread assembly includes a tread portion having a mounting surface and an opposing ground-engaging surface with a plurality of grooves therein. A reinforcing fabric layer is attached to the mounting surface of the tread portion.

BRIEF DESCRIPTION OF THE SEVERAL VIEWS OF THE DRAWING(S)

DETAILED DESCRIPTION OF THE INVENTION

Figure 1:
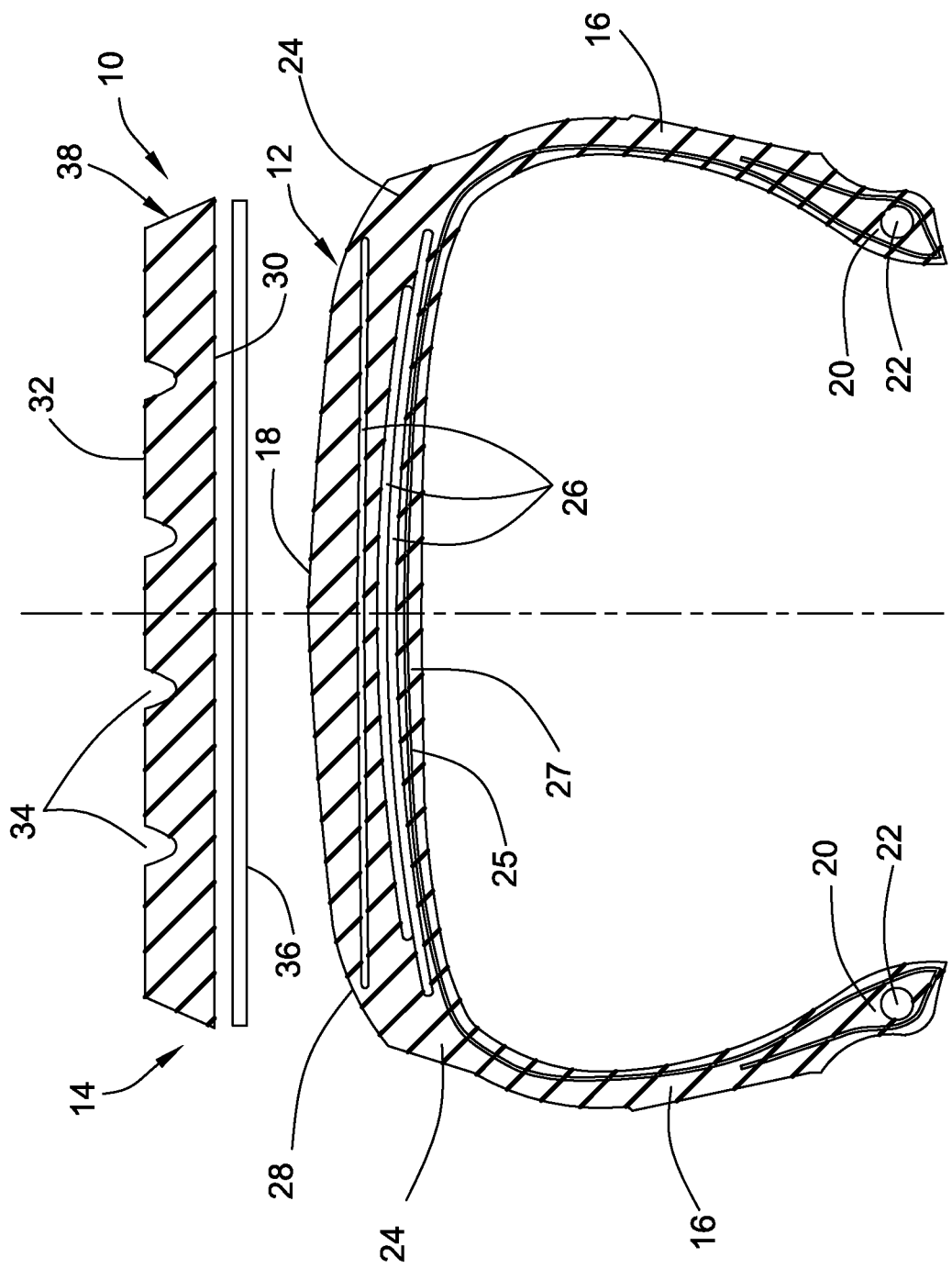
FIG. 1 is a schematic cross-sectional view of an exemplary tire with the tread portion and fiber reinforcing layer of the precured tread assembly of the present invention exploded away from the tire casing.
Figure 2:
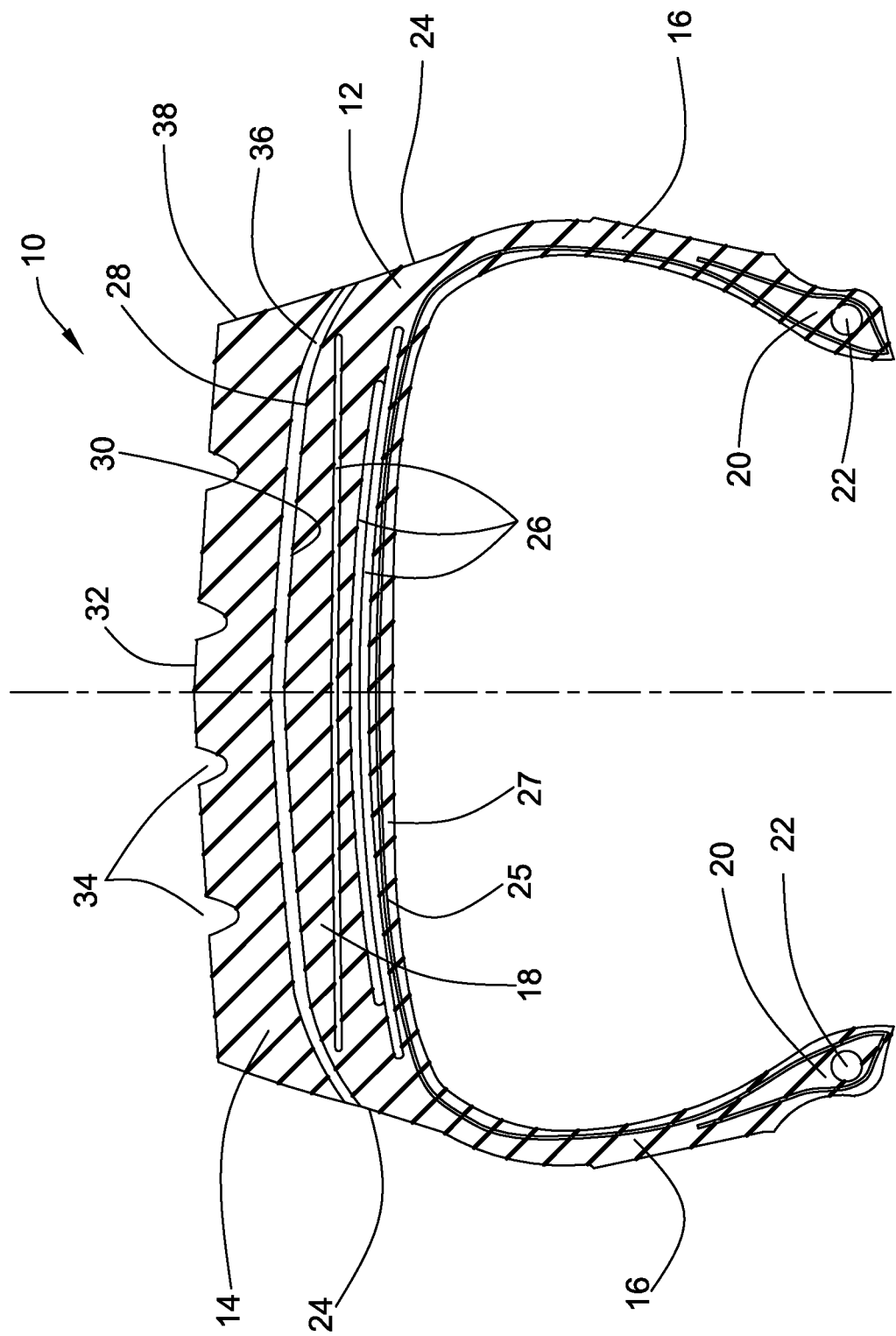
FIG. 2 is a schematic cross-sectional view of the exemplary tire of FIG. 1 with the precured tread assembly assembled on the tire casing.

Referring generally to FIGS. 1 and 2, an exemplary tire 10 is shown as having a tire casing 12 from which extends a precured tire tread assembly 14. The illustrated tire 10 is a radial tire; however, the invention applies equally to other types of tires, such as bias ply tires.

In the illustrated embodiment, the tire 10 includes a pair of side walls 16 bounded by a generally radially outward wall 18 or crown that spans side walls 16. Each side wall 16 extends radially inward from outer wall 18 and terminates in a bead area 20 designed for mounting on the tire rim (not shown). The bead area 20 may be designed in a variety of configurations depending on, for example, tire type, tire size or rim configuration. In the illustrated embodiment, each bead area 20 also includes a bead bundle 22. The bead bundle 22 may include, for example, metal strands or wires to improve the strength of bead area 20.

Side walls 16 may also include multiple layers, such as a rubber layer, a radial ply and an inner liner which cooperate to provide a strong but flexible side wall. Side walls 16 are joined to radially outward wall 18 and tread 14 through a pair of shoulder areas 24. Shoulder areas 24 extend towards the precured tread assembly 14 which, in turn, is disposed radially outwardly from the outer wall 18 of the tire casing 12. Additionally, the outer wall 18 may be strengthened by a plurality of belts 26 extending circumferentially about the tire 10 within the wall 18. The tire casing may further include an inner liner 25 and a carcass 27 in the area between the side walls 16.

After the tire tread wears beyond a certain limit, a tire must either be discarded or retreaded before it should be used on the vehicle for which it was designed. In cold process retreading, the remaining used tire tread is removed from the tire casing by a buffing machine. During the buffing operation, the used tire tread is ground away from the tire casing, leaving a buffed tread mounting surface 28 on the tire casing 12. The mounting surface 28 extends circumferentially about the tire casing 12 and also extends transversely across the outside of the outer radial wall 18 until it terminates at shoulder areas 46.

Following removal of the used tread layer, a process called skiving and filling may be performed on the tire casing 12. Skiving is the removal of damaged material from a tire prior to making a repair. Often, the tire casing 12 accumulates holes, nicks or tears due to stones or other sharp objects the tire comes in contact with during use. The injured or damaged area is first ground smooth by an appropriate grinding tool and then filled with repair gum. It is necessary to fill the injured areas to the level of the tread mounting surface 28 to avoid air pockets between the mounting surface 44 and the later applied precured tread assembly 14. Trapped air can have negative effects on the longevity of a typical retreaded tire. Following the skiving and filling operation, a building step occurs in which a layer of cushion gum and the new precured tread assembly are wrapped about the circumference of the tire casing 12 along the tread mounting surface 28.

The precured tread assembly 14 may be formed in a strip shape having a width corresponding to the width of the tread mounting surface 28 of the tire casing 12 and a length corresponding to the circumferential length of the mounting surface 28. The precured tread assembly 14 may have one flat mounting surface 30 and an opposing surface 32 that includes a plurality of grooves 34 designed to channel water and provide added traction during certain road conditions. The mounting surface 30 of the precured tread assembly 14 may be configured such that it may be applied to the corresponding mounting surface 28 on the circumferential outer surface of the tire casing 12. While the mounting surface 30 of the precured tread assembly 14 is flat in the illustrated embodiment, in other embodiments the precured tread assembly may have a mounting surface that is curved in order to match a curvature on the tread mounting surface of the tire casing.

In order to provide support to the precured tread as well as to help prevent punctures through the tread to the casing 12 once installed and in service, the precured tread may be provided with a fabric reinforcing layer 36 on the tire mounting surface 30 of the tread so as to create a precured tread assembly 14 including a tread portion 38 and a fabric reinforcing layer 36. Thus, when installed on a tire as shown in FIG. 2, the fabric reinforcing layer 36 is interposed between the tread portion 38 and the tire casing 12. In such a position, the fabric reinforcing layer 36 can serve as a barrier that can help block punctures or cuts through the tread from damaging the tire casing 12. The added puncture resistance of the precured tread package 14 (including the fabric reinforcing layer 36) can help reduce the number of tire casings that are damaged to such an extent that they need to be prematurely scrapped. Thus, the fabric reinforcing layer 36 may extend the useful life of the tire casings with which it is used. Additionally, the fabric reinforcing layer 36 can provide additional support to the precured tread portion 38 which could enable less rubber to be used in the precured tread.

The fabric reinforcing layer 36 may be applied to the precured tread portion 38 using a curing process. For example, the fabric reinforcing layer 36 may be cut to the desired length and width. To simplify the assembly process, the fabric reinforcing layer 36 may be precut in different sizes. Next, the fabric reinforcing layer 36 may be arranged on the mounting surface 30 on the underside of the tread portion 38. Prior to application of the fiber reinforcing layer 36, the mounting surface 30 of the precured tread portion 36 on which the fiber reinforcing layer is applied may be wiped with a cushion gum or other adhesive material to facilitate adhesion between the tread portion 38 and the fabric reinforcing layer 36. Next, the precured tread portion 38 and the fabric reinforcing layer 36 are cured in order to adhere the fabric reinforcing layer 36 to the tread portion 38 and thereby produce a final precured tread assembly 14. In order to impart a texture to the mounting surface 30 of the precured tread assembly 14, a cloth may be applied over the fabric reinforcing layer 36 on the side of the layer facing away from the tread portion 38 before it is cured. This texture can eliminate the need to buff the underside of the precured tread assembly 14 before it is applied to a tire casing 12. The cloth may be removed prior to application of the precured tread assembly to a tire casing.

According to one preferred embodiment, the fabric reinforcing layer 36 may be a nylon fabric. For example, the nylon fabric may be a fabric with nylon fibers like that presently used as either a chafer fabric or a breaker fabric in a tire. In one example, the nylon fibers may be nylon 6-6 or nylon 6. In such a case, the nylon fabric material may be 840/2, 1260/2, 1260/3, 1680/2 or 1890/2 denier. Other fabric materials that could be used include a fabric made of polyethylene terephthalate (PET) synthetic fibers, a fabric made of aramid synthetic fibers, such as those sold by DuPont under the tradename Kevlar, or a hybrid nylon/Kevlar material. A nylon fabric material has the advantage that it is easy to process and is available from a variety of sources. A PET fabric material is relatively inexpensive and offers high strength. A Kevlar fabric material offers good performance, but is relatively expensive. The fabric reinforcing layer may be impregnated, coated, covered or laminated with rubber in a known manner.

Further, the fabric reinforcing layer 36 may be a straight fabric, a woven fabric or a formed fabric. According to one preferred embodiment, the fabric reinforcing layer 36 may be oriented on the precured tread portion 38 such that the warp threads of the fabric reinforcing layer extend radially with respect to the tire casing 12 (i.e., perpendicular to the direction of rotation) when the precured tread assembly 14 is applied to a tire casing. Alternatively, the fabric reinforcing layer 36 may be oriented on the precured tread portion 38 such that the warp threads of the fabric reinforcing layer 36 extend circumferentially (i.e., around the circumferential surface of the tire casing) or at an angle, such as 30 or 60 degrees, with respect to the direction of rotation of the tire casing 12 when applied thereon. The fabric reinforcing layer 36 also may be oriented on the precured tread portion 38 so as to extend at in an S-shaped wave pattern with respect to the tire casing 12 when applied thereon. According to a further embodiment of the invention, the fabric reinforcing layer 36 may comprise two or more layers of reinforcing fabric material. When more than one fabric reinforcing layer 36 is used, the layers may be oriented on the precured tread so that they extend in a bias ply arrangement with respect to the tire casing 12 when the precured tread assembly 14 is applied thereto.

While the present invention has been discussed in the context of retreading a used tire casing, those skilled in the art will appreciate that the precured tread assembly of the present invention can also be used with a new tire casing and the advantage thereof, including increased puncture resistance and increased stability allowing for the use of less rubber, would be equally applicable with a new tire casing.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A precured tread assembly for mounting on a tire casing, the precured tread assembly comprising:
   a pre-cured tread portion having an axial tread portion width, a mounting surface, and an opposing ground-engaging surface with a plurality of grooves therein, wherein the mounting surface comprises:
      an axial surface width equal to the axial tread portion width;
      a reinforcing fabric layer comprising a first surface cured to an entirety of the mounting surface of the tread portion and an opposing second surface exposed to air, the first surface of the reinforcing fabric layer having a width corresponding to the axial surface width and a length corresponding to a circumference of the mounting surface,
      the reinforcing fabric layer comprising warp threads, the warp threads orientated on the tread portion such that the warp threads of the reinforcing fabric layer extend in a direction along a direction of rotation of the tread portion.

2. The precured tread assembly of claim 1 wherein the reinforcing fabric layer comprises nylon fibers.

3. The precured tread assembly of claim 1 wherein the reinforcing fabric layer comprises PET fibers.

4. The precured tread assembly of claim 1 wherein the reinforcing fabric layer comprises aramid fibers.

5. The precured tread assembly of claim 1, wherein:
   the pre-cured tread portion further comprises a circumferential tread portion length;
   the mounting surface further comprises a circumferential surface length equal to the circumferential tread portion length; and
   the length of reinforcing fabric layer is equal to the circumferential surface length.

6. A tire comprising:
   a tire casing; and
   a precured tread assembly applied to the tire casing, the precured tread assembly including:
      a tread portion having an axial tread portion width, a mounting surface, and an opposing ground-engaging surface with a plurality of grooves therein, wherein the mounting surface comprises:
         an axial surface width equal to the axial tread portion width;
         a reinforcing fabric layer comprising a first surface pre-cured to an entirety of the mounting surface of the tread portion and an opposing second surface in direct contact with cushion gum, the second surface of the reinforcing fabric being exposed to air prior to contacting the cushion gum, the first surface of the reinforcing fabric layer having a width corresponding to the axial surface width and a length corresponding to a circumference of the mounting surface, the reinforcing fabric layer comprising warp threads, the warp threads orientated on the tread portion such that the warp threads of the reinforcing fabric layer extend in a direction perpendicular to a direction of rotation of the tread portion.

7. The tire of claim 6 wherein the reinforcing fabric layer comprises nylon fibers.

8. The tire of claim 6 wherein the reinforcing fabric layer comprises PET fibers.

9. The tire of claim 6 wherein the reinforcing fabric layer comprises aramid fibers.

10. The tire of claim 6, wherein:
    the tread portion further comprises a circumferential tread portion length;
    the mounting surface further comprises a circumferential surface length equal to the circumferential tread portion length; and
    the length of reinforcing fabric layer is equal to the circumferential surface length.

11. A method of retreading a tire comprising the steps of:
    removing a used tread from an outer surface of a tire casing; and
    applying a precured tread assembly to the outer surface of the tire casing, the precured tread assembly including:
       a tread portion having an axial tread portion width, a mounting surface, and an opposing ground-engaging surface with a plurality of grooves therein, wherein the mounting surface comprises:
          an axial surface width equal to the axial tread portion width;
          a reinforcing fabric layer comprising a first surface pre-cured to an entirety of the mounting surface of the tread portion and an opposing second surface exposed to air, the first surface of the reinforcing fabric layer having a width corresponding to the axial surface width and a length corresponding to a circumference of the mounting surface, the reinforcing fabric layer comprising warp threads, the warp threads orientated on the tread portion such that the warp threads of the reinforcing fabric layer extend in a direction perpendicular to a direction of rotation of the tread portion.

12. The method of claim 11 wherein the reinforcing fabric layer comprises nylon fibers.

13. The method of claim 11 wherein the reinforcing fabric layer comprises PET fibers.

14. The method of claim 11 wherein the reinforcing fabric layer comprises aramid fibers.

15. The method of claim 11, wherein:
   the tread portion further comprises a circumferential tread portion length;
   the mounting surface further comprises a circumferential surface length equal to the circumferential tread portion length; and
   the length of reinforcing fabric layer is equal to the circumferential surface length.

16. The method of claim 11, further comprising, prior to applying the precured tread assembly to the outer surface of the tire casing:
   curing a fabric reinforcing layer to a mounting surface of a precured tread portion to form a precured tread assembly.

* * * * *